United States Patent Office 3,287,333
Patented Nov. 22, 1966

3,287,333
PROCESS FOR PREPARING A CONJUGATED DIENE - VINYL - AROMATIC BLOCK COPOLYMER WITH A LITHIUM - CONDENSED AROMATIC RING COMPOUND CATALYST
Robert P. Zelinski, Bartlesville, Okla., assignor to Phillips Petroleum Company, a corporation of Delaware
No Drawing. Filed Dec. 26, 1961, Ser. No. 162,636
10 Claims. (Cl. 260—83.7)

This invention relates to novel block copolymers containing three polymer blocks or segments. In one aspect, it relates to the preparation of novel block copolymers of certain conjugated dienes with vinyl-substituted aromatic hydrocarbons.

It is known that various types of polymers can be prepared from different monomeric materials, the particular type formed being generally dependent upon the procedure followed in contacting the materials in the polymerization zone. For example, copolymers such as butadiene-styrene copolymers can be prepared by the simultaneous reaction of the copolymerizable monomers. It is also possible to prepare polymers which are commonly known as graft copolymers. Graft copolymers result from the joining of a comonomer to an already formed polymer at random points along the polymer chain. Still another type of polymer can be obtained by a procedure known as block polymerization. The polymers, usually referred to as block copolymers, are formed by polymerizing a monomer onto the end of a polymer, the monomer being introduced in such a manner that substantially all of the coreacting molecules enter the polymer chain at this point. The particular method used in preparing the polymers has a great influence upon the properties of the product obtained. Thus, copolymers, graft copolymers and block copolymers differ greatly in their properties even though the weight percent of each of the monomeric materials contained in the polymer may be the same in each case.

In my copending application Serial No. 721,293 (filed March 13, 1958), a process is disclosed for preparing block copolymers from mixtures of conjugated dienes and vinyl-substituted aromatic hydrocarbons. According to this process, a mixture of monomers, e.g., 1,3-butadiene and styrene, is polymerized in the presence of an organolithium compound, such as an alkyllithium. The polymerization is conducted in the presence of a hydrocarbon diluent, and polar compounds, such as ethers, are excluded from the process since their presence results in the formation of a random copolymer rather than a block copolymer. Block copolymers prepared according to this process are composed of two blocks, one of the blocks being a copolymer of a conjugated diene and a vinyl-substituted aromatic hydrocarbon and the other block being a homopolymer of a vinyl-substituted aromatic hydrocarbon. The present invention provides a process whereby a block copolymer containing three blocks or segments is prepared.

It is an object of this invention to provide a novel process for preparing block copolymers of selected conjugated dienes with vinyl-substituted aromatic hydrocarbons.

Another object of the invention is to provide a novel block copolymer containing three polymer blocks.

A further object of the invention is to provide a novel initiator system for use in the preparation of block copolymers.

Other and further objects and advantages of the invention will become apparent to those skilled in the art upon consideration of the accompanying disclosure.

The prior art contains many references to the use of alkali metals and compounds of these metals to catalyze the polymerization of conjugated dienes. Most of the early work was done with sodium metal and sodium compounds, but lithium metal and lithium compounds are also mentioned. Prior to my copending application, there appears to be no disclosure that a block copolymer containing two blocks can be prepared by polymerizing, for example, a mixture of 1,3-butadiene and styrene in the presence of a monolithium compound. When polymerizing a mixture of butadiene and styrene according to my prior process, a copolymer containing butadiene and a small amount of styrene is initially formed. A lithium atom attaches itself to one end of the copolymer molecules, and after all of the butadiene is polymerized, the styrene polymerizes onto the end of the copolymer molecules having the attached lithium atom. The present invention resides in the discovery that a block copolymer containing three blocks can be prepared by providing an initiator system whereby a lithium atom is attached to each end of the polymer block initially formed in the polymerization. Furthermore, in addition to providing a polymer having a novel composition, the process of this invention provides a product which is rubbery and processable. It is very important that the inherent viscosity of the product not be too high, e.g., not greater than 2.0, for otherwise a processable polymer is not obtained. The block copolymer of this invention preferably has an inherent viscosity in the range of 0.70 to 2.0.

Broadly speaking, the process of this invention comprises the step of contacting a mixture of selected conjugated dienes and vinyl-substituted aromatic hydrocarbons with an initiator comprising the reaction product of lithium and a condensed ring aromatic compound in the presence of a hydrocarbon diluent selected from the group consisting of paraffinic, cycloparaffinic and aromatic hydrocarbons. The product obtained in the process is a block copolymer having three blocks or segments, i.e., a central copolymer block of the conjugated diene and the aromatic hydrocarbon and two end or terminal homopolymer blocks of the aromatic hydrocarbon.

In conducting a polymerization with organolithium compounds, it is necessary that these compounds be at least slightly soluble in hydrocarbons. When using alkyllithium compounds, there is no difficulty since these compounds are appreciably soluble in hydrocarbons. However, organolithium compounds containing more than one lithium atom are often prepared in an ether, and they are only very slightly soluble in hydrocarbons. It was completely unexpected, therefore, when it was found that the reaction product used as the initiator in the present process is sufficiently soluble in hydrocarbons so that as the polymerization proceeds it goes into solution and at the end of the reaction all of the initiator is dissolved. This permits the utilization of low initiator levels and makes it possible to produce polymers having a relatively low molecular weight. The reaction products used as the present initiator system are to be contrasted with multilithium compounds which are only difficulty soluble in hydrocarbons, such as reaction products of lithium with polyaryl substituted ethylenes, e.g., 1,2-dilithio-1,2-diphenylethane. When utilized to polymerize a mixture of monomers as described herein, these latter compounds require very high initiator levels and the resulting products have a very high inherent viscosity which renders them unsuitable for use.

Conjugated dienes which are used in preparing the block copolymers of this invention are 1,3-butadiene, 2-methyl-1,3-butadiene (isoprene), and 1,3-pentadiene (piperylene). The vinyl-substituted aromatic hydrocarbons which are employed in the practice of the present invention can be any vinyl-substituted aromatic hydrocarbon in which the vinyl group is attached to a nuclear carbon atom. It is to be understood that a compound having a substituent on the alpha carbon atom, such as alpha-methylstyrene, is not applicable to the practice of the present invention. Vinyl-substituted aromatic hydrocarbons which can be advantageously utilized include styrene, 1-vinylnaphthalene, 2-vinylnaphthalene, 3-methylstyrene, and alkyl, cycloalkyl, aryl, alkaryl and aralkyl derivatives thereof in which the total number of carbon atoms in the combined substituents is generally not greater than 12. Examples of these aromatic hydrocarbons include:

3-methylstyrene (3-vinyltoluene)
3,5-diethylstyrene
4-n-propylstyrene
2,4,6-trimethylstyrene
4-dodecylstyrene
3-methyl-5-n-hexylstyrene
4-cyclohexylstyrene
4-phenylstyrene
2-ethyl-4-benzylstyrene
4-p-tolylstyrene
3,5-diphenylstyrene
2,4,6-tri-tert-butylstyrene
2,3,4,5-tetramethylstyrene
4-(4-phenyl-n-butyl)styrene
3-(4-n-hexylphenyl)styrene
4,5-dimethyl-1-vinylnaphthalene
3-ethyl-1-vinylnaphthalene
6-isopropyl-1-vinylnaphthalene
2,4-diisopropyl-1-vinylnaphthalene
3,6-di-p-tolyl-1-vinylnaphthalene
6-cyclohexyl-1-vinylnaphthalene
4,5-diethyl-8-octyl-1-vinylnaphthalene
3,4,5,6-tetramethyl-1-vinylnaphthalene
3,6-di-n-hexyl-1-vinylnaphthalene
8-phenyl-1-vinylnaphthalene
5-(2,4,6-trimethylphenyl)-1-vinylnaphthalene
3,6-diethyl-2-vinylnaphthalene
7-dodecyl-2-vinylnaphthalene
4-n-propyl-5-n-butyl-2-vinylnaphthalene
6-benzyl-2-vinylnaphthalene
3-methyl-5,6-diethyl-8-n-propyl-2-vinylnaphthalene
4-o-tolyl-2-vinylnaphthalene
5-(3-phenyl-n-propyl)-2-vinylnaphthalene In the monomer mixture which is polymerized according to the present process, the total amount of vinyl-substituted aromatic hydrocarbon is in the range of 15 to 60 parts by weight per 100 parts by weight of total monomers. Furthermore, with regard to the product obtained, at least 45 weight percent of the vinyl-substituted aromatic hydrocarbon contained in the composition should be in the terminal homopolymer blocks. This latter limitation bears a direct relationship to the amount of polar compound contained in the polymerization system as will be discussed hereinafter.

As mentioned above, the initiator system used in the present process comprises the reaction product obtained by reacting lithium and a condensed ring aromatic compound. The condensed ring aromatic compound is selected from the group consisting of naphthalene, anthracene and phenanthrene, and alkyl derivatives thereof in which the total number of carbon atoms in the alkyl group or groups is preferably in the range of 1 to 6 carbon atoms. Examples of alkyl derivatives of naphthalene, anthracene, and phenanthrene include 1-methylnaphthalene, 2-methylnaphthalene, 1-tetra-butylnaphthalene, 2-amylnaphthalene, 2,4-di-n-propylnaphthalene, 9-methylanthracene, 1,4,5-triethylanthracene, 2,7-dimethylphenanthrene, and the like. In reacting these materials, at least 2 gram atoms of lithium per mol of the condensed ring aromatic compound is employed. It is generally preferred to employ an excess of the lithium, e.g., 4 gram atoms, in preparing the initiator system. After the reaction is completed, the excess lithium can be removed by filtration, decantation or other suitable method. The materials are generally reacted at a temperature below 50° F., e.g., at a temperature in the range of −40 to 40° F. It has been found to be particularly advantageous to react the materials at a temperature of about −15° F.

The reaction of the lithium and the aromatic compound is conducted in a polar solvent, and ethers are usually employed for this purpose. It is preferred to use as the solvent an aliphatic monoether having the formula ROR, wherein each R is an alkyl group containing from 2 to 12, inclusive, carbon atoms. Examples of such ethers include diethyl ether, diisopropyl ether, di-n-butyl ether, di-sec-butyl ether, ethyl n-propyl ether, ethyl isobutyl ether, ethyl tert-butyl ether, ethyl n-pentyl ether, and the like. Cyclic and methyl ethers, such as dimethyl ether, tetrahydrofuran and dimethoxyethane, are unsatisfactory for use in preparing the initiators since their presence in the polymerization inhibits the formation of the block copolymers of this invention. Other polar solvents, such as thioethers and tertiary amines, e.g., diethyl sulfide and triethylamine, can also be utilized as the solvent. Examples of other suitable thioethers and tertiary amines include diisopropyl sulfide, ethyl isopropyl sulfide, ethyl n-propyl sulfide, isopropyldiethylamine, and di-n-propylethylamine. The amount of the polar solvent employed in reacting the lithium with the condensed ring aromatic compound is not critical and can, therefore, vary within very wide limits. However, it has been found that there is a maximum amount of the polar compound which can be tolerated in the polymerization while still obtaining the block copolymer of this invention. Thus, as a practical matter, it is usually desirable to limit the amount of the polar compound used in preparing the initiator to that which can be tolerated in the polymerization. The amount of the polar solvent which can be tolerated in the polymerization system is critical. For example, in the case of ether, not more than about 1.75 parts of ether per 100 parts of total monomers can be present in the polymerization system. Otherwise, a block copolymer in which the end blocks contain at least 45 percent of the polymerized vinyl-substituted aromatic compound is not obtained. The presence in the polymerization system of more than about 1.75 parts of ether as described above will result in the formation of a large amount of random copolymer and end blocks containing less than 45 weight percent of the vinyl-substituted aromatic compound. It is usually preferred that the amount of ether present in the system be not more than about 1.2 parts per 100 parts of total monomers. If the amount of the polar compound employed in preparing the initator system exceeds the amount as specified above, it then becomes necessary to remove a portion of it prior to using the initiator in the polymerization. This can be accomplished by distillation or by replacement of the polar solvent with a hydrocarbon, preferably of the type to be used in the polymerization. There is nothing critical as regards the time during which the materials are reacted in forming the initiator system. The reaction is usually continued until all of the condensed ring aromatic compound has reacted with the lithium metal although it is not essential that such a procedure be followed. The reaction time generally falls within the range of 8 to 120 hours although shorter and longer times can be utilized.

In one embodiment of the invention, the initiator system is prepared by reacting lithium with a condensed ring aromatic compound and a conjugated diene. Examples of suitable dienes which can be used include 1,3-butadiene, isoprene, piperylene, 2,3-dialkyl-1,3-butadiene, such as 2,3-dimethyl-1,3-butadiene, and the like. It is usually preferred to use a conjugated diene which contains from 4 to 8, more desirably from 4 to 6, carbon atoms. The conditions under which the three materials are reacted in forming the initiator system are generally essentially the same as those described in the preceding paragraph. The materials are also reacted in a polar solvent, and the statements made hereinbefore regarding the types and amounts of the polar solvent are also applicable. The mol ratio of the conjugated diene to the aromatic compound is generally not greater than about 10:1, e.g., from 0.05 to 5 mols of the diene per mol of the aromatic compound. It is often preferred to add only a portion of the conjugated diene initially after which the remainder is added in one or more portions. This method of operation serves to minimize the polymerization of the diene while producing a fairly high concentration of the adduct.

The initiator systems prepared as described hereinbefore are very active. Furthermore, as previously mentioned, the initiators are of sufficient solubility that as the polymerization proceeds in the liquid hydrocarbon diluent, the initiators go into solution so that at the end of the reaction all of the initiator is dissolved. It has been found that the solubility of the initiators in the hydrocarbon diluents can be further increased by charging a small amount of a conjugated diene initially, thereby incorporating the conjugated diene into the catalyst and rendering it more soluble in the hydrocarbon diluent. It is usually preferred to use a conjugated diene similar to the one to be employed in the polymerization. The amount of conjugated diene added in this manner should be as small as possible, e.g., less than 20 weight percent of the diene to be subsequently charged. It is usually preferred to add from about 1 to about 10 mols of the conjugated diene per mol of the reaction product. In one procedure for increasing the solubility of the initiator in the hydrocarbon diluent, a small amount of conjugated diene, similar to that to be employed in the polymerization process, is added to the ether solution containing the initiator. The polar solvent can then be removed by any means such as by distillation and replaced with the hydrocarbon diluent to be used in the polymerization. The mixture of monomer materials can then be introduced in order to prepare the block copolymer of this invention. In a modification of the above procedure, the ether solution of the initiator is charged to the hydrocarbon diluent after which a small amount of a conjugated diene is added. This material is allowed to polymerize after which the polar solvent is removed and the mixture is monomeric materials used in polymerization is charged. This latter procedure is usually preferred since the concentration of polar solvent is substantially reduced because of the presence of the hydrocarbon diluent, thereby correspondingly reducing the amount of random copolymer initially formed in the polymerization. It is to be understood that if the amount of polar solvent present is less than about 1.75 parts per 100 parts of total monomer, it is unnecessary with the instant initiator to remove the polar solvent from the reaction mixture.

As stated hereinbefore, the process of this invention is conducted in the presence of a hydrocarbon diluent selected from the group consisting of paraffinic, cycloparaffinic and aromatic hydrocarbons. The preferred hydrocarbons are those containing from 3 to 12, inclusive, carbon atoms. Examples of suitable diluents include propane, isobutane, n-pentane, isooctane, n-dodecane, cyclopentane, cyclohexane, methylcyclohexane, benzene, toluene, xylene, naphthalene, and the like. It is to be understood that mixtures of two or more of these hydrocarbons can be used in the process.

The polymerization process of this invention can be carried out at temperatures varying over a rather wide range, e.g., in the range of −20 to 150° C. However, it is preferred to conduct the process at a temperature in the range of 0 to 125° C., and more desirably at a temperature in the range of 25 to 125° C. The polymerization reaction can be carried out under autogenous pressure. It is usually desirable to operate at a pressure sufficient to maintain the monomeric materials substantially in the liquid phase. The pressure will thus depend upon the particular materials being polymerized, the diluent being employed, and the temperature at which the polymerization is conducted. However, higher pressures can be employed if desired, these pressures being obtained by some such suitable method as the pressurization of the reactor with a gas which is inert with respect to the polymerization reaction.

An important aspect of the present invention resides in the fact that the instant initiator system makes it possible to operate at low levels while obtaining relatively low molecular weight polymers. The amount of the initiator employed in the polymerization is usually not greater than 5 millimoles of initiator per 100 grams of monomers. In general, the amount of the initiator is in the range of about 1 to about 5 millimoles per 100 grams of total monomers. The initator systems of this invention are sufficiently soluble so that when 5 millimoles or less of the initiator is charged, the system contains from 0.01 to 0.07 gram of solved (combined) lithium per 100 grams of monomers. When using less soluble organolithium compounds, it is necessary to employ very high initiator levels, and the polymers obtained have such high molecular weights that they are not processable.

The process of this invention is preferably carried out as a batch process. The procedures to be followed when adding a conjugated diene to the initiator system in order to render the initiator more soluble have been described hereinbefore. When these procedures are not followed, it is usually preferred to charge the conjugated diene and the vinyl-substituted aromatic hydrocarbon into a reactor containing the initiator and the diluent. The monomeric materials are introduced into the reactor simultaneously in the proportions as described above. The process of this invention can be also carried out semi-continuously by introducing additional charges of the monomeric materials into the reactor after the initial charges have been poylmerized. When a batch process is utilized, the time for the reaction can be as high as 24 hours or more although it is generally less than 24 hours.

Various materials are known to be destructive to the initiator systems of this invention. These materials include carbon dioxide, oxygen and water. It is highly desirable, therefore, that the monomers be freed of these materials as well as other materials which may tend to inactivate the initiator. Any of the known means for removing such contaminants can be used. Also, it is preferred that the diluent used in the process be substantially free of impurities, such as water, oxygen and the like. In this connection, it is desirable to remove air and moisture from the reaction vessel in which the polymerization is conducted. Although it is preferred to conduct the polymerization under anhydrous or substantially anhydrous conditions, it is to be understood that some small amount of water can be tolerated in the reaction mixture. However, the amount of water which can be tolerated in the mixture is insufficient to completely inactivate the initiator.

After the polymerization has been conducted to the desired degree, the initiator remaining can be deactivated by the addition of a material such as ethyl alcohol, isopropyl alcohol, or the like. It is usually preferred to add only an amount of the initiator-deactivating material which is sufficient to deactivate the initiator without causing precipitation of the dissolved polymer. It has also been found to be advantageous to add an antioxidant, such as 2,2'-methylene-bis(4-methyl-6-tert-butylphenol), to the polymer solution prior to precipitation of the polymer. After addition of the initiator-deactivating agent and the antioxidant, the polymer present in the solution can then be precipitated by the addition of an excess of a material such as ethyl alcohol or isopropyl alcohol. It is to be understood, however, that the deactivation of the initiator and precipitation of the polymer can be accomplished in a single step. The precipitated polymer can then be removed by filtration, decantation or the like. In order to further purify the polymer, the separated polymer can be redissolved in a suitable solvent and again precipitated by addition of an alcohol. Thereafter, the polymer is again recovered by suitable separation means as indicated hereinbefore and dried. Any suitable hydrocarbon solvents, such as those mentioned hereinbefore, can be used in this purification step to redissolve the polymer. The diluent and alcohol can in all cases be separated, for example, by fractional distillation and reused in the process. As hereinbefore mentioned, it is within the scope of the invention to utilize an antioxidant in the process to prevent oxidation of the polymer. The antioxidant can be added to the reaction mixture prior to precipitation of the polymer, to the solution of redissolved polymer, or to the diluent in which the polymer is to be subsequently redissolved.

The block copolymers produced in accordance with this invention, in general, have utility in applications where natural and synthetic rubbers are used. For example, they can be used in the manufacture of automobile tires, gaskets, and other rubbery articles. The block copolymers can also be advantageously utilized as adhesives. They are particularly useful in forming extruded articles, such as coated wire, because of their high extrudability. The block copolymers are also thermoplastic and show no shrinkage when molded. These properties render the block copolymers especially suitable for use in preparing molded articles. Block copolymers of this invention are further characterized by their very high green tensile strengths.

The block copolymers of this invention can be compounded by any of the known methods such as have been used in the past for compounding natural rubber. Vulcanization accelerators, reinforcing agents, and fillers, such as have been employed in synthetic and natural rubber, can likewise be used in compounding the polymers of this invention.

A more comprehensive understanding of the invention can be had by referring to the following illustrative examples, which are not intended, however, to be unduly limitative of the invention.

The polymers prepared in certain runs were subjected to an oxidative degradation procedure which destroyed the polymer molecules containing unsaturation (polybutadiene). This oxidation method is based upon the principle that polymer molecules containing ethylenic bonds when dissolved in p-dichlorobenzene and toluene can be broken into fragments by reaction with tert-butyl hydroperoxide catalyzed with osmium tetroxide. Saturated polymer molecules or molecular fragments such as polystyrene or the polystyrene units in block polymers containing no ethylenic bonds remain unattacked. The small fragments (low molecular weight aldehydes) and the low molecular weight polystyrene fragments from the copolymer block are soluble in ethanol whereas the unattacked high molecular weight polystyrene from the styrene homopolymer blocks is insoluble in ethanol. It is thus possible to effect a separation of the high molecular weight polystyrene which constitutes the homopolymer blocks of the block copolymer.

Approximately 0.5 gram of the polymer prepared as described below was cut into small pieces, weighed to within 1 milligram, and charged to a 125 milliliter flask. Forty to fifty grams of p-dichlorobenzene was then charged to the flask, and the flask was heated to 130° C. The flask was maintained at this temperature until the polymer present had become dissolved. The solution was then cooled to 80 to 90° C., and 8.4 ml. of a 71.3 percent by weight aqueous solution of tert-butyl hydroperoxide was added. One milliliter of 0.003 molar osmium tetroxide in toluene was then charged to the flask contents, and then resulting solution was heated to between 110 and 115° C. for 10 minutes. The solution was then cooled to between 50 to 60° C., after which 20 ml. of toluene was added and the solution was poured slowly into 250 ml. of ethanol containing a few drops of concentrated sulfuric acid. Polystyrene coagulated out of solution, and this polymer was recovered and dried. The weight percent of polystyrene recovered is recorded in the tables shown below.

EXAMPLE I

An initiator was prepared by reacting lithium, methylnaphthalene and isoprene in an ether medium. The initiator was thereafter employed in a rate study for the production of a butadiene-styrene block copolymer. The following recipe was used in preparing the initiator:

Recipe

| | |
|---|---|
| Lithium wire, grams | 2.2 |
| Methylnaphthalene, grams [1] _____(14.2 ml.) | 14.2 |
| Isoprene, grams _____(10 ml.) | 0.68 |
| Diethyl ether, milliliters | 47.2 |

[1] Mixture containing 23.1 percent 1-methylnaphthalene and 70.9 percent 2-methylnaphthalene.

The ingredients were charged, in the order named in the recipe, to a reactor which had been previously flushed with nitrogen. The reactor was closed and placed in a constant temperature bath (−15° F.), after which the reactants were agitated for approximately 52 hours. The reaction product, obtained in the form of a slurry, was solubilized by treatment with butadiene. Prior to solubilization a sample of the reaction mixture was withdrawn and the molarity determined by titration with 0.1 N hydrochloric acid. The temperature was adjusted to 41° F., and butadiene was then added in ten increments to make a total amount of 6 moles per mole of lithium-methylnaphthalene-isoprene reaction product. The ether was stripped and toluene added to give a solution that was 0.157 molar.

The lithium used in preparing the initiators can be in any convenient form, such as wire, chunks, or in finely divided form. It is also within the scope of the invention to the use lithium containing a small percentage e.g., up to about 5 weight percent, of another alkali metal, such as sodium.

The following recipe was employed for the production of a butadiene/styrene block copolymer using the initiator prepared as hereinbefore described.

Recipe

| | |
|---|---|
| 1,3-butadiene, parts by weight | 75 |
| Styrene, parts by weight | 25 |
| Cyclohexane, parts by weight | 1000 |
| Initiator, millimoles | 2.5 |
| Temperature, ° F. | 122 |
| Time, hours | 6.75 |

Cyclohexane was charged first to the reaction, after which it was purged with nitrogen, and butadiene, styrene, and the initiator were added in that order. The results obtained at various intervals throughout the reaction are shown in Table I.

TABLE I

| Run No. | Duration of run, Hours | Conv., Percent | Refractive Index | Inherent Viscosity [1] | Gel,[2] Percent | Polystyrene, Percent[3] |
|---|---|---|---|---|---|---|
| 1 | 0.5 | 14.7 | 1.5190 | 0.51 | 0 | |
| 2 | 1.0 | 34.1 | 1.5190 | 0.75 | 0 | |
| 3 | 1.5 | 55.9 | 1.5201 | 0.79 | 0 | |
| 4 | 2.0 | 69.2 | 1.5208 | 0.83 | 0 | |
| 5 | 3.08 | 79.8 | 1.5221 | 0.90 | 0 | 0 |
| 6 | 4.0 | 82.7 | 1.5239 | 0.85 | 0 | |
| 7 | 4.25 | 86.9 | 1.5269 | 0.90 | 0 | 2.1 |
| 8 | 4.37 | 91.8 | 1.5306 | 0.61 | 0 | |
| 9 | 4.50 | 95.9 | 1.5331 | 0.90 | 0 | 12.2 |
| 10 | 4.75 | 99.2 | 1.5348 | 1.26 | 0 | |
| 11 | 5.0 | 99.5 | 1.5354 | | | |
| 12 | 6.0 | 99.6 | 1.5355 | | | |
| 13 | 6.75 | 100 | 1.5355 | 0.88 | 0 | 16.5 |

[1] One-tenth gram of polymer was placed in a wire cage made from 80 mesh screen and the cage was placed in 100 ml. of toluene contained in a wide-mouth, 4-ounce bottle. After standing at room temperature (approximately 77° F.) for 24 hours, the cage was removed and the solution was filtered through a sulfur absorption tube of grade V porosity to remove any solid particles present. The resulting solution was run through a Medalia-type viscometer supported in a 77° F. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the original sample.
[2] Determination of gel was made along with the inherent viscosity determination. The wire cage was calibrated for toluene retention in order to correct the weight of swelled gel and to determine accurately the weight of dry gel. The empty cage was immersed in toluene and then allowed to drain three minutes in a closed wide-mouth, 2-ounce bottle. A piece of folded quarter-inch hardware cloth in the bottom of the bottle supported the cage with minimum contact. The bottle containing the cage was weighed to the nearest 0.02 gram during a minimum 3-minute draining period after which the cage was withdrawn and the bottle again weighed to the nearest 0.02 gram. The difference in the two weighings is the weight of the cage plus the toluene retained by it, and by subtracting the weight of the empty cage from this value the weight of toluene retention is found, i.e., the cage calibration. In the gel determination, after the cage containing the sample had stood for 24 hours in toluene, the cage was withdrawn from the bottle with the aid of forceps and placed in the 2-ounce bottle. The same procedure was followed for determining the weight of swelled gel as was used for calibration of the cage. The weight of swelled gel was corrected by subtracting the cage calibration.
[3] Determined by oxidative degradation.

The data in Table I indicate that a block copolymer was obtained. Infrared analysis on the final product showed that it had a vinyl content of 6.3 percent and a trans content of 41.9 percent.

One run was conducted for the polymerization of a mixture of butadiene and styrene in which a minor amount of tetrahydrofuran was added to the polymerization system. The initiator employed was the same as hereinbefore described except that after stripping the ether, an amount of toluene was added to give a solution that was 0.193 molar. The polymerization recipe was as follows:

*Recipe*

| | |
|---|---|
| 1,3-butadiene, parts by weight | 75 |
| Styrene, parts by weight | 25 |
| Cyclohexane, parts by weight | 1000 |
| Tetrahydrofuran, parts by weight | 1.5 |
| Initiator, millimoles | 1.2 |
| Temperature, ° F. | 122 |
| Time, hours | 16 |

Cyclohexane was charged first, after which the reactor was purged with nitrogen. Butadiene, styrene, tetrahydrofuran, and the initiator were then added in that order. The reaction was shortstopped with a solution of one weight percent of 2,2'-methylene-bis(4-methyl-6-tert-butyl-phenol) in isopronyl alcohol, and the polymer was coagulated in isopropyl alcohol and dried in a vacuum oven. The polymer had the following properties:

| | |
|---|---|
| Inherent viscosity [1] | 1.76 |
| Gel, percent [1] | 0 |

[1] See footnotes of Table I.

Analysis for polystyrene by oxidative degradation gave a value of zero.

This run shows that a block copolymer did not form in the presence of the tetrahydrofuran.

EXAMPLE II

A lithium-methylnaphthalene-isoprene initiator was prepared in the manner described in Example I except that the reactants were agitated for 40 hours in a −15° F. bath instead of 52 hours. The product was solubilized by treatment with butadiene, in accordance with the hereinbefore described procedure, using 6 moles of diene per mole of reaction product. Following solubilization, toluene was added to give a 0.25 molar solution which was used as an initiator for the production of a butadiene-styrene block copolymer. A rate study was conducted as in Example I, using the same polymerization recipe and procedure. About 0.5 part of ether per 100 parts of monomers was present in the systems. The results obtained are shown in Table II.

TABLE II

| Run No. | Duration of Run, Hours | Conversion, Percent | Refractive Index | Inherent Viscosity [1] | Gel,[1] Percent | Polystyrene, Percent [2] |
|---|---|---|---|---|---|---|
| 1 | 0.5 | 10.3 | 1.5173 | 0.73 | 0 | |
| 2 | 1.0 | 20.0 | 1.5191 | 0.78 | 0 | |
| 3 | 1.66 | 53.7 | 1.5200 | 0.86 | 0 | |
| 4 | 2.0 | 65.7 | 1.5215 | 0.88 | 0 | |
| 5 | 3.0 | 80.2 | 1.5241 | 0.96 | 0 | 0 |
| 6 | 3.92 | 88.3 | 1.5273 | 1.01 | 0 | |
| 7 | 4.45 | 98.7 | 1.5352 | 0.99 | 0 | 12.9 |

[1] See footnotes of Table I.
[2] Determined oxidative degradation.

In this run ether was not stripped from the initiator prior to diluting the solubilized reaction product with toluene. The data show that a block copolymer was produced in which at least 45 weight percent of the styrene charged was present in the polystyrene blocks.

EXAMPLE III

An initiator was prepared by reacting lithium, methylnaphthalene and isoprene in an ether medium. The following recipe was used in preparing the initiator:

*Recipe*

| | |
|---|---|
| Lithium wire, grams | 8 |
| Methylnaphthalene, grams [1] _____ (56 ml.) | 56 |
| Isoprene, grams _____ (41 ml.) | 27.9 |
| Diethyl ether, milliliters | 188 |
| Temperature, °F. | −15 |
| Time, hours | 40 |

[1] Commercial mixture of 1- and 2-methylnaphthalenes.

The procedure followed in preparing the initiator was similar to that described in Example I. The mixture was cooled to 41° F. and solubilized by addition of butadiene, using 4 moles per mole of the reaction product. The butadiene was added in increments in order to control the temperature.

The foregoing initiator was solubilized further by treatment with sufficient butadiene to make a product which contained 8 moles of the diene per mol of the lithium-methylnaphthalene-isoprene reaction product. This treatment was effected at 41° F., and the reaction mixture was diluted with toluene to a concentration of 0.2 molar. This initiator was employed for the preparation of a series of block copolymers of butadiene and styrene in which the monomer ratio, initiator level, and the temperature were varied. The diluent used in each case was 1000 milliliters of cyclohexane. Block copolymers were formed in all runs. The results of the runs are shown hereinafter in Table III.

TABLE III

| Run No. | Initiator Level, MMoles | Ether, PHM [2] | Butadiene/ Styrene Mole Ratio | Polymerization Time | Temp., °F. | Conv., Percent | ML-4 at 212° F.[3] | Refractive Index | Inherent Viscosity [1] | Gel,[1] Percent | Polystyrene, Percent [4] |
|---|---|---|---|---|---|---|---|---|---|---|---|
| 1 | 2.5 | 0.78 | 75/25 | 10 min | 212-234 | 89.5 | 20.1 | 1.5362 | 0.89 | 0 | 17.5 |
| 2 | 2.5 | 0.78 | 75/25 | 5 hrs | 122 | 90.5 | 41.2 | 1.5358 | 1.14 | 0 | 12.8 |
| 3 | 2.5 | 0.78 | 70/30 | 10 min | 212-234 | 92.6 | 54.0 | 1.5406 | 0.85 | 0 | 15.1 |
| 4 | 2.5 | 0.78 | 70/30 | 5 hrs | 122 | 99.6 | | 1.5398 | 1.22 | 0 | 20.9 |
| 5 | 3.0 | 0.93 | 60/40 | 5 hrs | 122 | 97.0 | 76.0 | 1.5482 | 0.72 | 0 | 26.8 |
| 6 | 3.5 | 1.08 | 60/40 | 5 hrs | 122 | 98.0 | 25.5 | 1.5479 | 0.69 | 0 | 24.9 |
| 7 | 3.0 | 0.93 | 60/40 | 10 min | 212-226 | 95.7 | 47.4 | 1.5488 | 0.65 | 0 | 24.5 |

[1] See footnotes to Table I.
[2] Parts per 100 parts of monomers.
[3] ASTM D927-55T.
[4] Determined by oxidative degradation.

EXAMPLE IV

Lithium was reacted with methylnaphthalene and isoprene in diethyl ether to prepare a polymerization initiator. The methylnaphthalene used was a commercial mixture of alpha- and beta-methylnaphthalenes. The recipe was as follows:

*Recipe*

| | |
|---|---|
| Lithium wire, grams | 2.2 |
| Methylnaphthalene, grams _____ (14.2 ml.) | 14.2 |
| Isoprene, grams _____ (10 ml.) | 0.68 |
| Diethyl ether, milliliters | 47.0 |
| Temperature, °F. | −15 |
| Time, hours | 42 |
| Molarity | 1.73 |

The procedure described in Example I was followed in preparing the initiator. The temperature was adjusted to 41° F., and butadiene was added to solubilize the reaction product, using 8 moles/mole of reaction product. Ether was stripped from the resulting mixture which was then diluted with dry toluene to give a product having a molarity of 0.185. This material was used as the initiator for a series of runs in which butadiene/styrene block copolymers were prepared. The initiator level was held constant while the butadiene/styrene ratio was varied. The solvent for the polymerization was cyclohexane, 1000 parts by weight being used per 100 parts monomers. The polymerization temperature was 122° F., and reaction time was 6 hours. The results of the runs are shown in Table IV.

TABLE IV

| Run No | 1 | 2 | 3 | 4 | 5 |
|---|---|---|---|---|---|
| Butadiene/styrene weight ratio | 80.0/20.0 | 69.8/30.2 | 59.8/40.2 | 50.0/50.0 | 30.3/69.7 |
| Initiator level, mmoles | 2.25 | 2.25 | 2.25 | 2.25 | 2.25 |
| Conversion, percent | 99.3 | 100 | 99.5 | 100 | 100 |
| Inherent viscosity [1] | 0.87 | 0.82 | 0.70 | 0.63 | 0.59 |
| Mooney value: [2] | | | | | |
| ML-4 at 212° F | 5 | 18 | 37 | 77 | 95 |
| ML-4 at 250° F | | | 9 | 19 | 16 |
| Refractive index | 1.5319 | 1.5401 | 1.5472 | 1.5552 | |
| Polystyrene, percent [3] | 9.5 | 16.0 | 24.7 | 34.7 | 56.9 |
| Green properties: | | | | | |
| Tensile, p.s.i.[4] | 9 | 102 | 291 | 810 | 2,800 |
| Elongation, percent [4] | 500 | 580 | 820 | 900 | 50 |

[1] See footnote to Table I.
[2] ASTM D297-55T.
[3] Determined by oxidative degradation.
[4] ASTM D412-51T. The specimens were prepared by hot milling into sheets which were then smoothed in a laboratory Carver press.

These data show that although the inherent viscosity decreased consistently with an increase in the relative amount of styrene, the Mooney value increased. A comparison of the Mooney values at 212 and 250° F. reveals a high degree of thermoplasticity. The data also shows that at least 45 percent of the styrene was present in the polystyrene blocks.

EXAMPLE V

A polymerization initiator was prepared by reacting lithium with methylnaphthalene and isoprene in diethyl ether, and the reaction product was solubilized by treatment with butadiene. Ether was stripped from the resulting mixture which was diluted with toluene to give a product with a molarity of 0.21. The quantities of materials employed and the procedure followed were the same as described in Example IV. This reaction product was employed in a series of runs for the preparation of butadiene/styrene block copolymers. The initiator level was varied, but the monomer ratio was maintained substantially constant. The polymerization solvent was cyclohexane, 1000 parts by weight being used per 100 parts monomer. The temperature was 122° F., and polymerization time was 6 hours. The results of the runs are summarized in Table V.

contained polystyrene blocks, the amount of styrene in these blocks being at least 45 percent of the styrene charged.

EXAMPLE VI

Four butadiene/styrene block copolymer samples were prepared for evaluation using 70/30 and 60/40 monomer ratios. Two of the samples were blends of runs in which there was some variation in initiator level. A lithium-methylnaphthalene-isoprene product solubilized with 8 moles of butadiene per mole of reaction product was used as the initiator in each run. A summary of the runs together with polymer properties is presented in Table VI.

TABLE V

| Run No. | 1 | 2 | 3 | 4 | 5 | 6 | 7 | 8 |
|---|---|---|---|---|---|---|---|---|
| Butadiene/styrene wt. ratio | 70.7/29.3 | 70.8/29.2 | 70.8/29.2 | 70.8/29.2 | 70.7/29.3 | 70.3/29.7 | 70.3/29.7 | 70.7/29.3 |
| Initiator level, moles | 2.25 | 2.00 | 1.75 | 1.50 | 1.25 | 1.00 | 0.75 | 0.55 |
| Conversion, percent | 99.2 | 99.6 | 99.8 | 98.4 | 99.8 | 99.2 | 99.2 | 98.8 |
| Inherent viscosity [1] | 0.81 | 0.89 | 0.99 | 1.14 | 1.08 | 1.54 | 1.66 | 1.95 |
| Mooney value [1]: | | | | | | | | |
|   ML-4 at 212° F | 24 | 43 | 65 | 104 | [2] | [2] | | |
|   ML-4 at 250° F | | 15 | 24 | 45 | 86 | [2] | [2] | |
| Refractive Index | 1.5396 | 1.5393 | 1.5394 | 1.5390 | 1.5391 | 1.5391 | 1.5390 | 1.5390 |
| Polystyrene, percent [3] | 16.2 | 17.8 | 16.7 | 19.2 | 22.0 | | | 24.0 |
| Green Properties: [1] | | | | | | | | |
|   Tensile, p.s.i | 80 | 208 | 327 | 652 | 1,105 | 2,260 | | |
|   Elongation, percent | 520 | 780 | 850 | 1,010 | 1,100 | 1,100 | | |

[1] See footnotes to Tables I and IV.
[2] Too high to measure.
[3] Determined by oxidative degradation.

The data in Table V show that as the initiator level is decreased, the polystyrene content increased and the inherent viscosity increased. The difference in Mooney values at 212 and 250° F. demonstrate that the polymers possess a high degree of thermoplasticity. All polymers

TABLE VI

| | Sample | | | | | |
|---|---|---|---|---|---|---|
| | I (Blend) [1] | | II (Blend) [2] | | | |
| Run No. | 1 | 2 | 3 | 4 | 5 | 6 |
| Bd./Sty. Wt. Ratio | 70/30 | 70/30 | 60/40 | 60/40 | 60/40 | 60/40 |
| Initiator Level, Mmoles | 2.25 | 2.0 | 3.0 | 3.0 | 3.0 | 3.25 |
| Ether, MHM | 0 | 0 | 0.93 | 0.93 | 0.93 | 0.65 |
| Time | [3] 16 | [3] 16 | [4] 10 | [4] 10 | [4] 10 | [4] 10 |
| Temperature, ° F | 122 | 122 | 212–226 | 212–226 | 212–226 | 212–221 |
| Conversion, percent | 100 | 100 | 95 | 96 | 96 | 96 |
| Grams in Blend | 600 | 300 | 37 | 41 | 30 | 89 |
| Inherent Viscosity [5] | 0.86 | 0.89 | 0.86 | 0.73 | 0.66 | 0.65 | 0.57 | 0.62 |
| ML-4: [5] | | | | | | |
|   212° F | 42 | 37 | 60 | 39 | 31 | 48 | 45 | 64 |
|   250° F | 15 | | | 13 | | | 9 | |
| Refractive Index | 1.5392 | 1.5391 | 1.5391 | 1.5471 | 1.5480 | 1.5488 | 1.5470 | 1.5461 |
| Bound Styrene, percent | 29.5 | 29.4 | 29.4 | 39.8 | | | 39.6 | |
| Polystyrene, percent [6] | 17.5 | 17.7 | 18.7 | 28.0 | | 24.5 | 27.8 | 27.6 |
| Green Properties: [5] | | | | | | |
|   Tensile, p.s.i | 120 | 150 | 312 | 350 | | | 440 | |
|   Elongation, percent | 770 | 650 | 870 | 880 | | | 690 | |

| | Sample | | | | | | |
|---|---|---|---|---|---|---|---|
| | II (Blend) [2] | | | | | III | IV |
| Run No. | 7 | 8 | 9 | 10 | 11 | 12 | 13 |
| Bd./Sty. Wt. Ratio | 60/40 | 60/40 | 60/40 | 60/40 | 60/40 | 70/30 | 60/40 |
| Initiator Level, Mmoles | 3.25 | 3.2 | 3.1 | 3.0 | 3.0 | 1.8 | 2.4 |
| Ether, MHM | 0.65 | 0.64 | 0.62 | 0 | 0 | 0.36 | 0 |
| Time | [4] 10 | [4] 10 | [4] 10 | [4] 10 | [4] 10 | [3] 6 | [3] 16 |
| Temperature, ° F | 212–226 | 212–223 | 212–230 | 212–223 | 212–219 | 122 | 122 |
| Conversion, percent | 93 | 96 | 96 | 96 | 96 | 100 | 100 |
| Grams in Blend | 90 | 77 | 95 | 92 | 88 | | |
| Inherent Viscosity [5] | 0.73 | 0.71 | 0.72 | 0.78 | 0.78 | 1.16 | 0.71 |
| ML-4: [5] | | | | | | | |
|   212° F | 51 | 33 | 30 | 52 | 42 | 94 | 46 |
|   250° F | | | | | | 50 | 13 |
| Refractive Index | 1.5474 | 1.5476 | 1.5472 | 1.5476 | 1.5473 | 1.5398 | 1.5474 |
| Bound Styrene, percent | 40.0 | 40.4 | 39.9 | 40.4 | 40.0 | 30.2 | 40.2 |
| Polystyrene, percent [6] | 27.6 | 26.2 | 25.9 | 27.7 | 27.8 | 19.8 | 26.1 |
| Green Properties: [5] | | | | | | | |
|   Tensile, p.s.i | | | | | | 635 | 230 |
|   Elongation, percent | | | | | | 985 | 810 |

[1] Sample I is a blend of the polymers obtained in Runs 1 and 2.
[2] Sample II is a blend of the polymers obtained in Runs 3 to 11.
[3] Hours.
[4] Minutes.
[5] See footnotes to Tables I and IV.
[6] Determined by oxidative degradation.

The four block copolymer samples were evaluated in a wire insulation recipe. The compounding recipe, processing properties, and physical properties of the cured stocks are shown in Table VII.

TABLE VII

| Sample Designation | I | II | III | IV |
|---|---|---|---|---|
| Compounding recipe, parts by weight: | | | | |
| Block copolymer | 100 | 100 | 100 | 100 |
| Stearic acid | 10 | 10 | 10 | 10 |
| Zinc oxide | 10 | 10 | 10 | 10 |
| Agerite Stalite [1] | 1.5 | 1.5 | 1.5 | 1.5 |
| Dixie Clay [2] | 100 | 100 | 100 | 100 |
| Purecal M [3] | 50 | 50 | 50 | 50 |
| Cumar MH 2½ [4] | 15 | 15 | 15 | 15 |
| Sulfur | 2 | 2 | 2 | 2 |
| Altax [5] | 1.5 | 1.5 | 1.5 | 1.5 |
| Methyl Zimate [6] | 0.7 | 0.7 | 0.5 | 0.7 |
| Processing properties: | | | | |
| Mooney,[7] (MS-1½ at 212° F.) | 22.0 | 21.5 | 50.0 | 18 |
| Extrusion at 180° F.:[8] | | | | |
| Inches/minute | 85.6 | 84 | 82.5 | 100 |
| Grams/minute | 145 | 157.6 | 157.0 | 184 |
| Rating (Garvey Die) | 12 | 12 | 7 | 12 |
| Physical properties, cured 30 minutes at 307° F.: | | | | |
| 300% Modulus, p.s.i.[9] | 940 | 1,300 | 1,400 | 1,250 |
| Tensile, p.s.i.[9] | 1,130 | 1,370 | 1,870 | 1,320 |
| Elongation, percent [9] | 610 | 440 | 580 | 400 |
| Crescent tear, lbs./in.[10] at 80° F | 245 | 250 | 265 | 305 |
| Shore A hardness:[11] | | | | |
| 80° F | 80 | 92 | 85 | 90 |
| 212° F | 48 | 46 | | 58 |
| Gehman freeze point, ° C.[12] | −66 | −74 | −67 | −52 |

[1] Octylated diphenylamine.
[2] A hard-type, white-to-cream colored kaolin (aluminum silicate).
[3] Chemically precipitated calcium carbonate, particle size 0.12–0.32 micron.
[4] Composition composed of polymers of indene, coumarone, and associated coal tar compounds.
[5] Benzothiazyl disulfide.
[6] Zinc dimethyldithiocarbamate.
[7] ASTM D297-55T.
[8] By essentially the same procedure described by Garvey et al, Ind. & Eng. Chem. 34, 1309 (1942). As regards the "Rating" figure, 12 designates an extruded product considered to be perfectly formed whereas lower numerals indicate less perfect products.
[9] ASTM D412-51T.
[10] ASTM D624-54.
[11] ASTM D676-55T. Shore durometer, Type A.
[12] ASTM D1053-54T (modified). Gehman torsional apparatus. Test specimens are 1.625 inches long, 0.125 inch wide and 0.077 inch thick. The angle of twist is measured at 5° C. intervals. Extrapolation to zero twist gives the freeze point.

It is seen from the foregoing data that the block copolymers of this invention have excellent extrusion properties, which renders them particularly suitable for certain uses, such as wire coating. It is noted also that the stocks are fairly hard even without the addition of a resin. The block copolymers are, therefore, very suitable for use in shoe sole and floor tile applications.

EXAMPLE VII

Several series of runs were conducted in which the initiators of this invention were used to polymerize mixtures of butadiene and styrene. Control runs were also conducted in which the quantity of ether present was greater than the allowable maximum amount, i.e., greater than 1.75 parts per 100 parts of monomers, and in which organolithium compounds other than those of the present invention were used.

The recipes used in preparing the several different initiators are shown hereinbelow.

*Recipes*

Lithium-stilbene adduct (LISA):

| | | |
|---|---|---|
| Lithium wire | g. atom | 0.25 |
| Trans-stilbene | mol | 0.05 |
| Ethyl ether | ml | 300 |
| Temperature, ° F. | | 122 |
| Time, hours | | 40 |
| Alkalinity | M | 0.065 |

Lithium-isoprene adduct (LIA):

| | | |
|---|---|---|
| Lithium wire | g. atom | 0.4 |
| Isoprene | mol | 0.10 |
| Naphthalene | mol | 0.02 |
| Ethyl ether | ml | 100 |
| Temperature, ° F. | | −15 |
| Time, hours | | 48 |
| Alkalinity | M | 0.58 |

Lithium-methylnaphthalene-isoprene adduct (LIMI):

| | | |
|---|---|---|
| Lithium wire | g. atom | 0.15 |
| Methylnaphthalenes | mol | 0.046 |
| Isoprene | mol | 0.05 |
| Ethyl ether | ml | 23.5 |
| Temperature, ° F. | | −15 |
| Time, hours | | 96 |
| Alkalinity | M | 1.88 |

Lithium-methylnaphthalene adduct (LIMA):

| | | |
|---|---|---|
| Lithium wire | g. atom | 0.15 |
| Methylnaphthalenes | mol | 0.046 |
| Ethyl ether | ml | 23.5 |
| Temperature, ° F. | | −15 |
| Time, hours | | 72 |
| Alkalinity | M | [1] 0.367 |

[1] Diluted with 100 ml. of toluene.

The same general procedure was followed in preparing the several adducts. Each bottle used was initially pre-dried by purging cyclohexane in the bottle with prepurified nitrogen. The solvent was then dumped, and the bottle was blown dry with nitrogen. The solid ingredients were then weighed and charged to the bottle under a nitrogen pad. The lithium used contained from 1 to 2 percent of sodium. The bottle was then purged and capped. The liquid ingredients were then added by means of a hypodermic syringe. Concentration of the difunctional initiators was determined by titration with 0.1 N HCl solution.

The polymerizations were conducted in accordance with the recipe shown hereinafter. The lithium-methylnaphthalene-isoprene adduct (LIMI) and the lithium-methylnaphthalene adduct (LIMA) were used in the runs according to the invention while the other adducts were used in control runs.

*Polymerization recipe*

Parts by weight

| | |
|---|---|
| 1,3-butadiene | 70. |
| Styrene | 30. |
| Toluene | 1000. |
| Ethyl ether | Variable. |
| Initiator | 0.014, 0.028, 0.042, 0.056, 0.070 (1, 2, 3, 4, 5 mhm.). |
| Temperature, ° F. | 122. |
| Time, hours | 16. |

The polymerizations were conducted in 26-ounce beverage bottles. Solvents, butadiene, styrene and initiators were measured in volumes. Polymerizations were terminated by adding 5 ml. of a solution of alcohol containing an anti-oxidant. Conversions (98 to 101 percent) were determined by weighing the coagulated, dried polymer. The results obtained in the various runs are shown below in Table VIII.

TABLE VIII

| Run No. | Initiator, MHM [1] | Ether, PHM [2] | Viscosity [3] | | Polystyrene Percent [4] |
|---|---|---|---|---|---|
| | | | Inherent | Mooney (ML-4 at 212° F.) | |
| Lithium-stilbene adduct (LISA) | | | | | |
| 1 | 1 | 11 | 1.99 | 110 | 10.2 |
| 2 | 2 | 22 | 0.92 | 6 | 3.3 |
| 3 | 3 | 33 | 0.63 | 2 | 0 |
| Lithium-isoprene adduct (LIA) | | | | | |
| 4 | 2 | 2.4 | 1.19 | 72 | 12.2 |
| 5 | 3 | 3.6 | 0.89 | 5 | 9.3 |
| 6 | 4 | 4.8 | 0.67 | 1 | 6.4 |
| 7 | 5 | 6.0 | 0.63 | ---------- | 4.1 |
| Lithium-methylnaphthalene-isoprene adduct (LIMI) | | | | | |
| 8 | 2 | 0.8 | 1.36 | 149 | 18.5 |
| 9 | 3 | 1.2 | 1.11 | 48 | 16.3 |
| 10 | 4 | 1.6 | 0.87 | 10 | 15.3 |
| 11 | 5 | 2.0 | 0.67 | 3 | 11.1 |
| Lithium-methylnaphthalene adduct (LIMA) | | | | | |
| 12 | 2 | 0.6 | 1.34 | 144 | 17.2 |
| 13 | 3 | 0.9 | 0.99 | 27 | 14.4 |
| 14 | 4 | 1.2 | 0.84 | 9 | 13.2 |
| 15 | 5 | 1.5 | 0.71 | 3 | 9.6 |

[1] Millimoles per 100 parts of monomers.
[2] Parts per 100 parts of monomers.
[3] See footnotes to Tables I and IV.
[4] Determined by oxidative degradation procedure.

Runs were also conducted in which the polymerizations were carried out in cyclohexane rather than toluene. Except for the change in the diluent, the same polymerization recipe was used as shown above. Initiators prepared as described above were used in these runs. The results of the runs are shown below in Table IX.

TABLE IX

| Run No. | Initiator, MHM [1] | Ether, PHM [2] | Viscosity [3] | | Polystyrene Percent [4] |
|---|---|---|---|---|---|
| | | | Inherent | Mooney (ML-4 at 212° F.) | |
| Lithium-stilbene adduct (LISA) | | | | | |
| 16 | 1 | 11 | 2.16 | 123 | 6.7 |
| 17 | 2 | 22 | 1.09 | 10 | 1.2 |
| 18 | 3 | 33 | 0.83 | 2 | 0 |
| Lithium-isoprene adduct (LIA) | | | | | |
| 19 | 2 | 2.4 | 1.39 | 88 | 12.8 |
| 20 | 3 | 3.6 | 1.99 | 9 | 9.1 |
| 21 | 4 | 4.8 | 0.79 | 2 | 4.4 |
| 22 | 5 | 6.0 | 0.63 | ---------- | 3.1 |
| Lithium-methylnaphthalene-isoprene adduct (LIMI) | | | | | |
| 23 | 2 | 0.8 | 1.27 | 119 | 19.0 |
| 24 | 3 | 1.2 | 0.98 | 27 | 16.0 |
| 25 | 4 | 1.6 | 0.78 | 7 | 15.2 |
| 26 | 5 | 2.0 | 0.70 | 2 | 11.0 |

[1] Millimoles per 100 parts of monomers.
[2] Parts per 100 parts of monomers.
[3] See footnotes to Tables I and IV.
[4] Determined by oxidative degradation procedure.

Runs 1 to 7 and 16 to 22 are control runs in which lithium-stilbene and lithium-isoprene were used as initiators to polymerize the mixture of butadiene and styrene. It is seen that the block copolymer product of this invention was not obtained in any of these runs. Thus, the product either contained no polystyrene blocks, or the polystyrene blocks contained less than 45 percent of the styrene charged. In runs 8 to 15 and 23 to 26, the initiators of this invention were used. A block copolymer having an inherent viscosity less than 2 and having polystyrene blocks containing at least 45 percent of the styrene charged was obtained in each of runs 8 to 10, 12, 13, and 23 to 25. The product of run 14 substantially fulfilled these requirements in that it had an inherent viscosity of 0.84 and contained 13.2 percent polystyrene. Runs 11, 15 and 26 did not produce a block copolymer having the specified composition. In runs 11 and 26, the polymerization systems contained more than 1.75 parts of ether per 100 parts of monomer, and as a result a large amount of random copolymer was formed. In run 15, the quantity of ether present exceeded the preferred maximum amount of ether that can be tolerated, i.e., 1.2 parts per 100 parts of monomers. These data indicate that systems employing certain initiators of this invention can tolerate more ether than systems using other initiators.

The data in Tables VIII and IX demonstrate that the amount of ether present in the polymerization system is a critical factor in determining the type of product produced. In preparing the lithium-stilbene and lithium-isoprene adducts used in control runs 1 to 7 and 16 to 22, it was necessary to employ relatively large amounts of ether in order to obtain the amount of dissolved lithium required to initiate the polymerization. And when these initiators were subsequently used in the polymerizations, the large amount of ether present caused the formation of a large amount of random copolymer. The initiators of the present invention on the other hand are much more soluble and can be prepared in much smaller amounts of ether. And as a result, the present initiators can be used directly in the polymerization without the necessity of removing the ether.

As will be evident to those skilled in the art, many variations and modifications of the invention can be practiced in view of the foregoing disclosure. Such variations and modifications are believed to be clearly within the spirit and scope of the present invention.

I claim:

1. A process for preparing a block copolymer formed of a central copolymer block and two terminal homopolymer blocks which process comprises the steps of polymerizing a mixture of (1) a conjugated diene selected from the group consisting of 1,3-butadiene, isoprene and piperylene, and (2) a vinyl-substituted aromatic hydrocarbon with an initiator comprising the reaction product obtained by reacting at least 2 grams atoms of lithium per mole of a condensed ring aromatic compound selected from the group consisting of naphthalene and phenanthrene, and alkyl derivatives of these compounds in an aliphatic monoether having the formula ROR, wherein each R is an alkyl group containing 2 to 12 carbon atoms, inclusive, said polymerizing occurring in the presence of a hydrocarbon diluent selected from the group consisting of paraffinic, cycloparaffinic and aromatic hydrocarbons and the amount of said ether present in the polymerization being less than about 1.75 parts of ether per 100 parts of said mixture of a conjugated diene and a vinyl-substituted aromatic hydrocarbon; and recovering the block copolymer product so produced.

2. The process according to claim 1 in which a conjugated diene is added to said reaction product obtained by reacting said lithium and said aromatic compound, said addition occurring prior to polymerizing said mixture and the amount of conjugated diene added being in the approximate range of 1 to 10 mols per mol of said reaction product.

3. The process according to claim 1 in which said initiator comprises the reaction product obtained by reacting said lithium, said condensed ring aromatc compound and a conjugated diene containing from 4 to 8 carbon atoms, the amounts of materials used being at least 2 gram atoms of lithium per mol of said aromatic compound and the mol ratio of said conjugated diene to said aromatic compound being less than about 10:1.

4. The process according to claim 3 in which a conjugated diene is added to said reaction product obtained by reacting said lithium, said aromatic compound and said conjugated diene, said addition occurring prior to polymerizing said mixture and the amount of conjugated diene added being in the approximate range of 1 to 10 mols per mol of said reaction product.

5. The process according to claim 1 in which said polymerizing occurs at a temperature in the range of −20 to 150° C. and at a pressure sufficient to maintain the polymerization mixture in the liquid phase.

6 The process according to claim 1 in which said mixture of a conjugated diene and a vinyl-substituted aromatic hydrocarbon contains in the range of 15 to 60 parts by weight of said vinyl-substituted aromatic hydrocarbon per 100 parts by weight of said mixture.

7. The process according to claim 1 in which said mixture consists essentially of 1,3-butadiene and styrene.

8. In a process for preparing a block copolymer formed of a central copolymer block of 1,3-butadiene and styrene and two terminal homopolymer blocks of styrene the improvement which comprises the steps of polymerizing a mixture of 1,3-butadiene and styrene with not over 5 millimoles per 100 grams of monomers of an initiator consisting essentially of the reaction product obtained by reacting 2 gram atoms of lithium per mole of methylnaphthalene in an aliphatic monoether having the formula ROR wherein R is an alkyl radical having 2 to 12 carbon atoms, said polymerizing occurring in the presence of a hydrocarbon diluent selected from the group consisting of paraffinic, cycloparaffinic and aromatic hydrocarbons and the amount of said ether present in the polymerization being less than about 1.75 parts of ether per 100 parts of said mixture of 1,3-butadiene and styrene; and recovering the block copolymer product having an inherent viscosity of less than about 2 and containing in said homopolymer blocks at least 45 weight percent of the total amount of styrene incorporated in the polymer so produced.

9. In a process for preparing a block copolymer formed of a central copolymer block of 1,3-butadiene and styrene and two terminal homopolymer blocks of styrene the improvement which comprises the steps of polymerizing a mixture of 1,3-butadiene and styrene with not over 5 millimoles per 100 grams of monomers of an intiator consisting essentially of the reaction product obtained by reacting two gram atoms of lithium per mole of methylnaphthalene and a conjugated diene containing from 4 to 8 carbon atoms, the mol ratio of said conjugated diene to said methylnaphthalene being less than about 10:1, in an aliphatic monoether having the formula ROR, wherein R is an alkyl radical having 2 to 12 carbon atoms, said polymerizing occurring in the presence of a hydrocarbon diluent selected from the group consisting of paraffinic, cycloparaffinic, and aromatc hydrocarbons, and the amount of said ether present in the polymerization being less than about 1.75 parts of ether per 100 parts of said mixture of 1,3-butadiene and styrene; and recovering the block copolymer product having an inherent viscosity of less than about 2 and containing in said homopolymer block at least 45 weight percent of the total amount of styrene incorporated in the polymer.

10. The process of claim 9 in which a conjugated diene selected from the group consisting of butadiene and isoprene is added to said reaction product prior to polymerizing said mixture and the amount of said conjugated diene being in the approximate range of 1 to 10 mols per mol of said reaction product.

References Cited by the Examiner

UNITED STATES PATENTS

| 2,962,472 | 11/1960 | Stuart | 260—82.1 X |
| 3,030,346 | 4/1962 | Cooper | 260—83.7 |
| 3,110,706 | 11/1963 | Vollmert et al. | 260—94.2 |
| 3,170,903 | 2/1965 | Stearns | 260—83.7 |

OTHER REFERENCES

Coates: "Organo-Metallic Compounds," John Wiley & Sons, Inc., New York, N.Y. (1960), pages 32–42 (Scientific Library).

JOSEPH L. SCHOFER, *Primary Examiner.*

WILLIAM H. SHORT, *Examiner.*

C. R. REAP, L. WOLF, W. HOOVER,
*Assistant Examiners.*